United States Patent
Lundgren et al.

(10) Patent No.: US 9,253,417 B2
(45) Date of Patent: Feb. 2, 2016

(54) REMOTE VIDEO PRODUCTION

(75) Inventors: Kent Lundgren, Stocksund (SE); Roger Allstedt, Stockholm (SE); Leif Toftgaard Pedersen, Jyllinge (DK)

(73) Assignee: TWENTYFOURSEVEN HOLDING AB (SE)

( * ) Notice: Subject to any disclaimer, the term of this patent is extended or adjusted under 35 U.S.C. 154(b) by 308 days.

(21) Appl. No.: 13/884,240

(22) PCT Filed: Nov. 2, 2011

(86) PCT No.: PCT/SE2011/051308
§ 371 (c)(1),
(2), (4) Date: Jul. 12, 2013

(87) PCT Pub. No.: WO2012/064256
PCT Pub. Date: May 18, 2012

(65) Prior Publication Data
US 2013/0278786 A1    Oct. 24, 2013

(30) Foreign Application Priority Data
Nov. 9, 2010   (SE) ...................................... 1051176

(51) Int. Cl.
*H04N 5/28*    (2006.01)
*H04H 60/04*   (2008.01)
*H04H 60/05*   (2008.01)

(52) U.S. Cl.
CPC ................. *H04N 5/28* (2013.01); *H04H 60/04* (2013.01); *H04H 60/05* (2013.01)

(58) Field of Classification Search
CPC ......... H04N 5/28; H04H 20/04; H04H 60/04; H04H 60/05
See application file for complete search history.

(56) References Cited

U.S. PATENT DOCUMENTS

| | | | | |
|---|---|---|---|---|
| 6,452,612 | B1 * | 9/2002 | Holtz et al. | 715/723 |
| 7,024,677 | B1 * | 4/2006 | Snyder et al. | 725/86 |
| 7,302,644 | B2 * | 11/2007 | Holtz et al. | 715/720 |
| 7,526,178 | B2 * | 4/2009 | Harradine et al. | 386/326 |
| 8,006,184 | B2 * | 8/2011 | Holtz et al. | 715/723 |
| 2002/0026256 | A1 | 2/2002 | Hilton | |
| 2002/0109710 | A1 * | 8/2002 | Holtz et al. | 345/723 |

(Continued)

FOREIGN PATENT DOCUMENTS

| | | |
|---|---|---|
| EP | 1 331 808 | 7/2003 |
| EP | 1694031 | 8/2006 |

(Continued)

OTHER PUBLICATIONS

Kimiyama et al., Experiments in Transferring High-Definition Video Material over an IP Network, NTT Technical Review, vol. 6, No. 3, Mar. 2008, Japanese language 4 pages, English language 6 pages.
International Search Report for International Application No. PCT/SE2011/051308, dated Mar. 13, 2012, 4 pages.

(Continued)

*Primary Examiner* — Nicholas Giles
(74) *Attorney, Agent, or Firm* — Foley & Lardner LLP

(57) ABSTRACT

The present invention relates to a system for remote video and/or audio production, which system comprises a first part related to the control room for the video production and a second part on the site of an event to be recorded, and where the first and second part communicate with each other by means of a data stream. It is proposed that the data stream is adapted to be sent between the first and second part by means of a wide area network.

21 Claims, 4 Drawing Sheets

(56) References Cited

U.S. PATENT DOCUMENTS

| | | | |
|---|---|---|---|
| 2002/0146232 A1* | 10/2002 | Harradine et al. | 386/46 |
| 2002/0175931 A1* | 11/2002 | Holtz et al. | 345/716 |
| 2002/0186233 A1* | 12/2002 | Holtz et al. | 345/716 |
| 2004/0230997 A1* | 11/2004 | Kaylani | 725/111 |
| 2005/0052527 A1* | 3/2005 | Remy et al. | 348/14.08 |
| 2005/0239399 A1* | 10/2005 | Karabinis | 455/3.02 |
| 2009/0027482 A1* | 1/2009 | Emig et al. | 348/14.02 |
| 2009/0290070 A1 | 11/2009 | Duke et al. | |
| 2009/0323802 A1 | 12/2009 | Walters et al. | |
| 2010/0272190 A1 | 10/2010 | Kim et al. | |

FOREIGN PATENT DOCUMENTS

| | | |
|---|---|---|
| JP | 2003-244482 | 8/2003 |
| JP | 2006-165689 | 6/2006 |
| JP | 2006-210975 | 8/2006 |
| WO | WO-2007/023626 | 3/2007 |
| WO | WO 2008038261 | 4/2008 |
| WO | WO 2009014716 | 1/2009 |

\* cited by examiner

REMOTE VIDEO PRODUCTION

FIELD OF INVENTION

The present invention relates to a system for the remote video and/or audio production, said system comprising a first part related to the control room for said video production and a second part on the site of an event to be recorded, where said first and second part communicate with each other by means of a data stream.

DESCRIPTION OF BACKGROUND ART

Outside broadcasting is the production of television or radio programmes (typically to cover news and sports events) from a mobile television studio. This mobile control room is known as an "Outside Broadcasting Van", "OB Van", "OB Bus", "mobile unit", "remote truck", "live truck", "live eye", or "production truck". The mobile OB Bus is positioned at, or near, a remote site of recording and signals from cameras and microphones on the remote site of recording come into the OB Bus for processing and transmission to a center for possibly final production and finally broadcasting. There is also a lot of verbal communication between the persons on the site and the persons in the OB Bus and communication of data besides the actual signals from cameras and microphones, such as meta data from the different equipment used to capture the signals on the site and control data used to control the cameras and microphones on the site from the OB Bus.

A crossbar switch is an assembly of individual switches between multiple inputs and multiple outputs. The switches are arranged in a matrix. If the crossbar switch has M inputs and N outputs, then a crossbar has a matrix with M×N crosspoints or places where the "bars" cross. At each crosspoint is a switch; when closed, it connects one of M inputs to one of N outputs. A given crossbar is a single layer, non-blocking switch. Collections of crossbars can be used to implement multiple layer and/or blocking switches. A crossbar switching system is also called a co-ordinate switching system. One input can be connected to several outputs simultaneously, just as several inputs can be connected to one output simultaneously.

In this description it shall be understood that a communication matrix is a unit with the characteristics and logical function of a crossbar switch but which necessarily does not have to be a traditional hardware crossbar switch; it can be any switch with multiple inputs and outputs which can be controlled to connect one input to one or several outputs simultaneously and one or several inputs to one output simultaneously.

In a recording and production of media material there are several persons with different tasks involved, for example during a video production there are the persons at the actual site, such as camera men, audio technicians and reporters, and there are the persons in the OB Bus, such as video and audio technicians, mixers, producers, graphic designers, lightning artists and editors. These persons have to be able to communicate with each other, both on the site, within the OB Bus and also between the site and the OB Bus. For this it is known to use a communication matrix through which is it possible to enable the communication between any persons on the site of the event and in the OB Bus.

Some cameras for video production comprises the camera head and a camera control unit (CCU) where high speed real time communication must be maintained between the camera head and camera control unit during all time of capturing the video signal, both for communicating control signals to and from the camera head and for communicating the actual video signal. A multiplexed cable, usually a triaxial cable or hybrid fiber cable, is used for the communication between the camera head and the CCU. Each signal and function to control and manage the camera and the actual camera signal can be derived from the CCU and transported to the OB bus by means of any other type of signal transportation.

It is also known to provide remote video production where a distance can be found between the site for the event and the control room and where required communication is established between the site and control room by means of a data stream. An example of remote video production can be found in patent publication U.S. 2009/0290070 A1.

SUMMARY OF THE PRESENT INVENTION

Problems

There are many problems with the use of the traditional OB Bus, such as the transportation of the bus itself, travel time and cost for the crew on the OB Bus, environmental problems in the transportation and the use of the bus on site. These problems are multiplied on big events where there might be many buses on one and the same site from different production or broadcasting teams.

It is also a problem to even transport an OB Bus to some events since the site for the event might be on a place that is hard to reach with a large bus. An OB Bus is also limited in its capabilities to function as a control room compared to a standard control room; it would be desirable to have all the conveniences and equipment of a normal control room on site for the recording of an event at a distance from the normal control room.

For these reasons there have been some attempts to provide the possibility for remote video and audio production where the crew that usually is in the OB Bus on the site for the event can remain in the normal control room and only the crew required to acquire the actual signals needed to record the event with necessary equipment are moved to the site of the event, and where information is communicated between the site and the control room by means of some kind of data stream.

It is still a technical problem to establish a system for the remote video and/or audio production over large distances, such as between cities, over countries, over continents or between continents, where the system comprises a first part related to the control room for the video production and a second part on the site of an event to be recorded and where the first and second part communicate with each other by means of a data stream.

It is a problem to find required bandwidth to transport all information needed to establish a system for remote video and/or audio production and to optimize the use of available bandwidth for such communication.

It is also a problem to prioritize between different signals between the first and the second part in order to optimize the use of available bandwidth in the communication.

It is a technical problem to provide possibilities for members of a first crew in the control room and members of a second crew on the site to communicate freely with each other over large distances.

It is also a problem to set up and manage such communication possibilities between members of the first and second crew over large distances.

Solution

With the purpose of solving one or more of the above indicated problems, and from the standpoint of the above indicated field of invention, the present invention teaches that the data stream is adapted to be sent between the first and second part by means of a wide area network, such as the Internet.

It is proposed that a signal path is established through the wide area network between said first and second part, which signal path comprises at least a first and a second logically separated path, that a first logical signal path is adapted to transport primary data, where the first logical signal path is adapted to provide a quality of service with zero time delay in the transportation of primary data, and that the second logical signal path is adapted to transport secondary data, which secondary data can accept a lower quality of service.

The primary data is real time data, such as video and audio signals.

The secondary data comprises data relating to many different kinds of information where the real-time requirements are not as high as for the actual video and audio signals. This data can for instance be remote camera control data through which it is possible to control remote cameras on the site from the control room, it can be control data between any camera remote control panel in the control room and any camera control unit at the site, it can be remote audio control data through which it is possible to control remote audio on the site from the control room, it can be data for error management and error control of equipment on the site from the control room, and it can be voice communication between members of a first crew in the control room and members of a second crew on the site where such voice communication is not critical for any time delays. Some voice communication between members of the first crew and members of the second crew may have real time requirements in which case data for transporting this communication will be primary data.

Communication between crew members on the two different teams is important and it is proposed that, in order to provide required communication possibilities between the two teams, the first part comprises a first communication matrix, where first input and output connections are dedicated to members of the first crew through which the first communication matrix is adapted to enable any required communication between the members of the first crew.

It is also proposed that the second part comprises a second communication matrix, where second input and output connections are dedicated to members of the second crew through which the second communication matrix is adapted to enable any required communication between the members of the second crew.

These two matrixes will enable communication for respective crew members in the control room and at the site, however in order to also provide communication between the two different crews it is also proposed that third input and output connections in the first communication matrix are dedicated to members of the second crew as if the members of the second crew were present in the control room, and that fourth input and output connections in the second communication matrix are dedicated to members of the first crew as if the members of the first crew were present at the site. It is proposed that the first or secondary data, depending on the real-time requirements of the communication, comprises incoming data to the third and fourth input connections and outgoing data from the third and fourth output connections, which will enable the communication between members of mutually different crews.

With the purpose of providing a possibility to set up and manage the second matrix from the control room it is proposed that the secondary data comprises control data required to set up, manage and control the second communication matrix from the control room. It is also proposed that the second communication matrix is configured and managed to be a logical mirror of the first communication matrix.

Since there are many different kinds of secondary data with mutually different requirements regarding the quality of service for communicated information and with the purpose of enable an optimization of available bandwidth for the data stream it is proposed that the second logical signal path is divided into several different signal paths each providing different quality of service, where data related to real time applications, such as remote control of equipment and voice communication between crew members, is adapted to be communicated through a logical signal path with a higher quality of service than data related to non real time applications, such as error management and management of the communication matrixes.

It should also be understood that real time data other than the actual video and audio signal, such as voice communication between crew members and remote control of equipment, can be regarded as being primary data and thus be communicated through the first logical signal path.

It should also be understood that if there is sufficient bandwidth in the signal path, then it is possible to establish the second logical signal path in the same path and with the same quality of service as the first logical signal path. Thus it is possible that any kind of data, even data with very low transmission requirements, or even all of the data between the first and second unit, can be communicated with zero time delay if required bandwidth is available.

One way of realise the signal path is that at least the first logical signal path is realized by means of optical fiber communication.

It is also possible that the second logical signal path is realized by means of optical fiber communication.

It should be understood that the first part can be adapted to communicate with several separate second parts, thereby enabling the remote production of events taking place on different sites or of different events not related to each other.

Advantages

The advantages of a system according to the present invention are that the communication of data that is required between the site of the event and the control room in a system for remote video and/or audio production can be realised so that live broadcast is possible without any time delay due to the distance between the site of the event and the control room.

It is an advantage to provide the possibility of unlimited possibilities for the crew in the control room and the crew at the site of the event to communicate with each other just as if they were at the same location communicating through one mutual communication matrix.

It is also an advantage to produce the video and/or audio material from a distant live event with the comfort and equipment level of a normal control room compared to an OB Bus.

BRIEF DESCRIPTION OF THE DRAWINGS

A system according to the present invention will now be described in detail with reference to the accompanying drawings, in which.

DESCRIPTION OF EMBODIMENTS AS PRESENTLY PREFERRED

Figure 1:
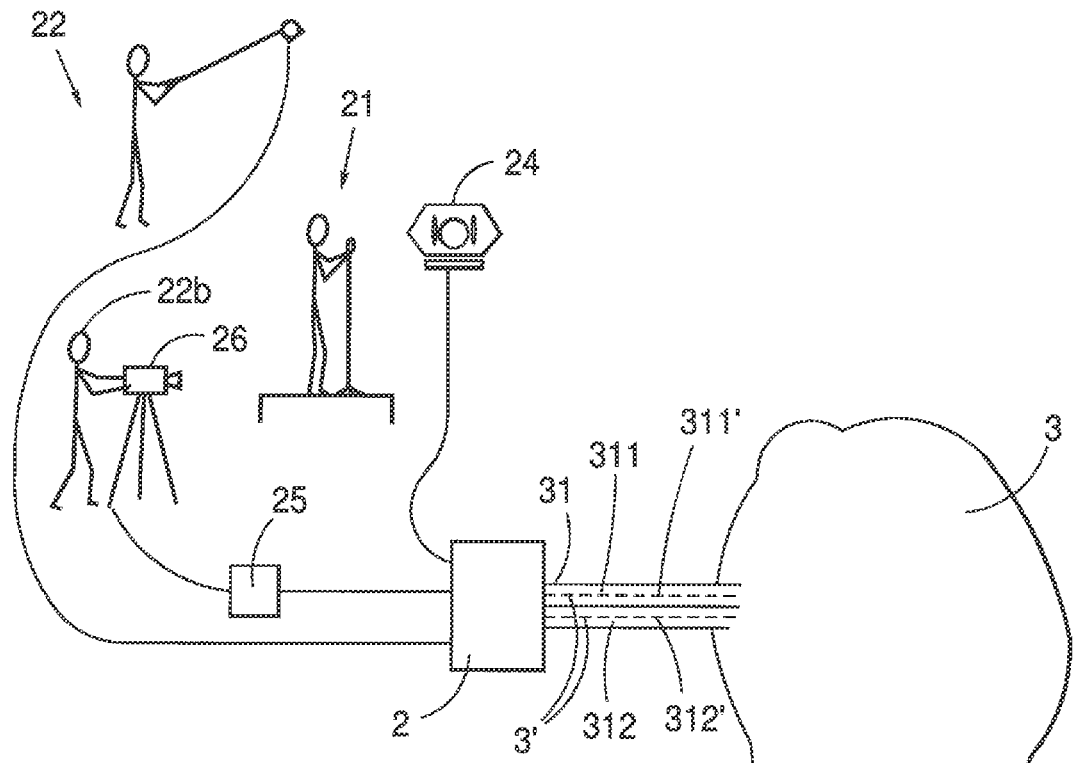
FIG. 1 is a schematic and simplified illustration of a system according to the present invention.
Figure 1:
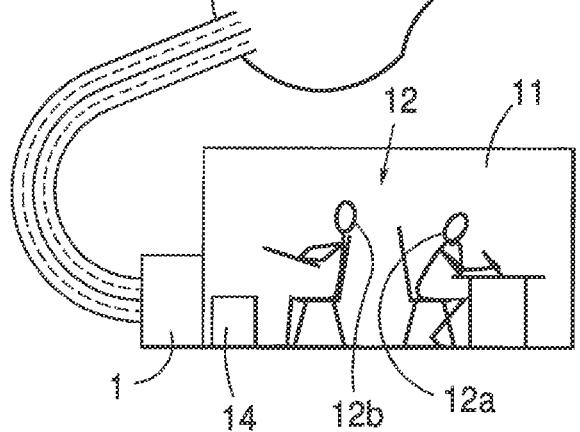

The present invention will now be described with reference to FIG. 1 showing a system for remote video and/or audio production.

It shall be understood that in the description of the present invention a video and audio production is described, however, the present invention can also be used for a remote audio production recording only audio from a remote site. Even if pure audio might not require the same bandwidth for communicating the audio information as video or video and audio information, the principles and the system according to the present invention can also be used for pure audio production.

The inventive system comprises a first part 1 related to the control room 11 for the video production and a second part 2 on the site 21 of an event to be recorded.

The first and second part 1, 2 are adapted to communicate with each other by means of a data stream 3', which data stream is adapted to be sent between the first and second part 1, 2 by means of a wide area network 3, such as the Internet.

It is possible to set up and dedicate a point to point pathway between the first and second part 1, 2 through a wide area network 3 and thereby create a virtual Intranet on the wide area network through which safe communication can be established between the first and the second unit. Communication can be safe in many ways, such as in the sense that data is delivered uncompromised, in the sense that it is not monitored by an unauthorized party and in the sense that it is delivered on time. Even if all of these aspects are important it should be understood that the present invention relates to the time aspect of the data communication in the communication of real time information.

The present invention proposes that a signal path 31 is established through the wide area network between the first and second part 1, 2 and that the signal path 31 comprises at least a first 311 and a second 312 logically separated path.

The first logical signal path 311 is adapted to transport primary data 311' and to provide a quality of service with zero time delay in the transportation of primary data 311'. The second logical signal path 312 is adapted to transport secondary data 312', which secondary data can accept a lower quality of service than the quality of service provided by the first logical signal path 311.

The primary data 311' is real time data, such as video and audio signals. In order to provide the shortest possible delay it is proposed that the audio and video signals are sent without any management of the signal at the site 21, such as compression or synchronization. This will require high bandwidth for standard definition video and even higher for high definition video. If the signal is compressed then even high definition video can be sent with lower bandwidth than uncompressed standard definition video, however, the compression of the signal before sending the signal will cause some delay. It is thus possible to choose a compressed signal with a very short delay requiring a lower bandwidth or an uncompressed signal without the delay for compression but requiring a higher bandwidth.

The secondary data 312' comprises data related to signals or information that does not necessarily have real time requirements. Secondary data 312' can for instance be remote camera control data through which it is possible to control a remote camera 24 on the site 21 from the control room 11, it can be control data between any camera remote control panel 14 in the control room 11 and any camera control unit 25 at the site 21 for the indirect control of a camera 26, or remote audio control data through which it is possible to control remote audio 27 on the site 21 from the control room 11. These examples of secondary data 312' might still have some real time requirements even if they might not have the strict requirement of zero time delay.

The signal protocol used for the control of remote cameras 24 or remote audio 27, such as microphone preamplifiers, can for instance be RS422 or RS232, which are standard protocols that require very low bandwidth for communication.

Other examples of secondary data 312' with even lower communication requirements are data for error management and error control of equipment on the site 21 from the control room 11 or data related to back up of other real time data, such as back up of video and audio information.

Data related to the voice communication between members 12a, 12b of a first crew 12 in the control room 11 and members 22a, 22b of a second crew 22 on the site 21 might have requirements of zero time delay and is then regarded to be primary data 311'. This data could also be regarded as secondary data 312' depending on the urgency of the communication.

Figure 2:
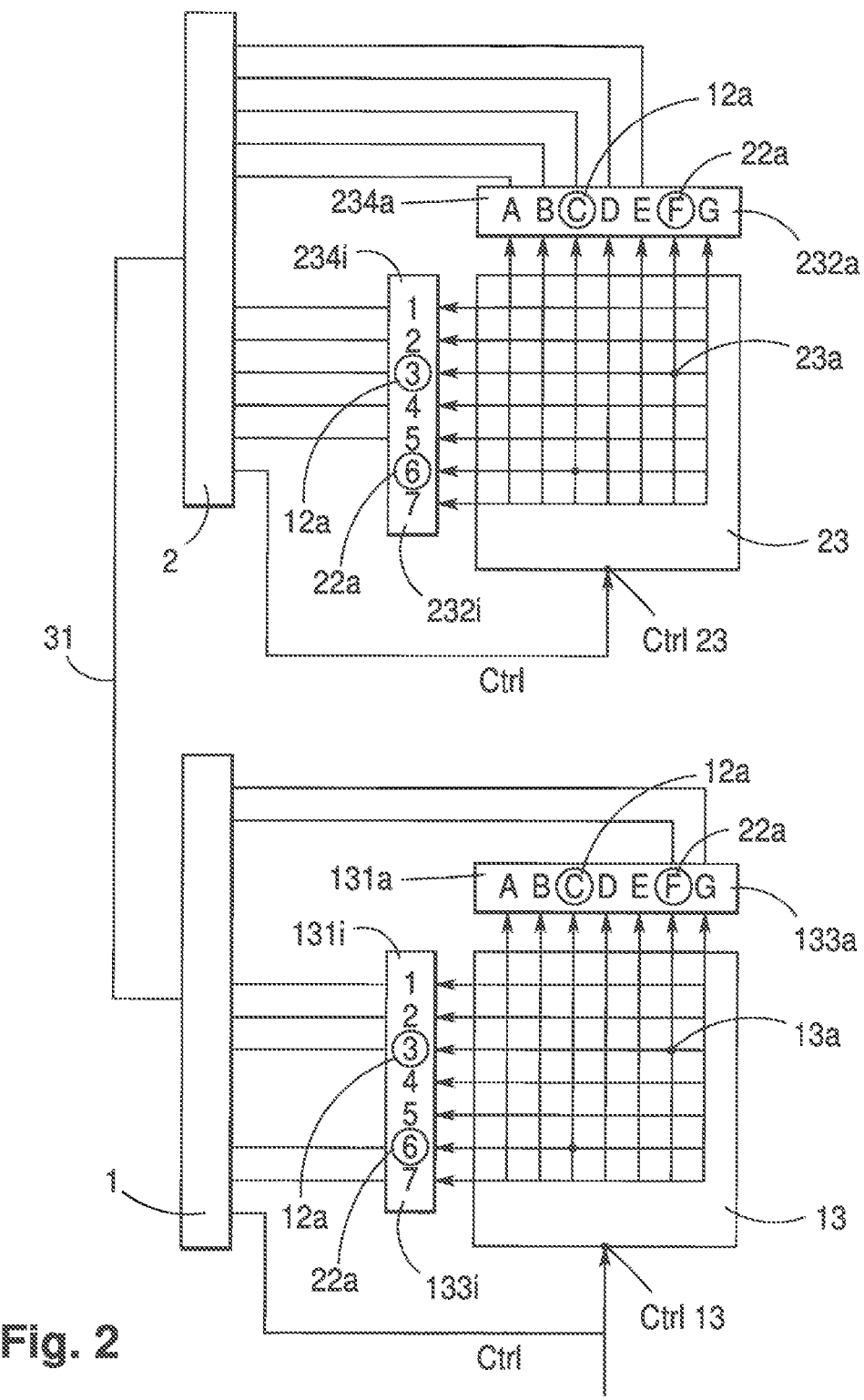
FIG. 2 is a schematic and simplified illustration of a first and second communication matrix adapted to function together according to the present invention.

Regardless of the priority of this communication the present invention teaches that communication between members 12a, 12b of the first crew 12 and members 22a, 22b of the second crew 22 can be realised as will be described in relation to FIG. 2.

It is proposed that the first part 1 comprises a first communication matrix 13, and that in this first communication matrix 13 are first input 131 i and output 131o connections dedicated to members 12a, 12b of the first crew 12. This means that the first communication matrix 13 is adapted to enable any required communication between members of the first crew in the control room through these first input and output connections 131i, 131o.

In the same way it is proposed that the second part 2 comprises a second communication matrix 23, and that in this second communication matrix 23 are second input 232i and output 232o connections dedicated to members 22a, 22b of the second crew 22. This means that the second communication matrix 23 is adapted to enable any required communication between members of the second crew at the site through these second input and output connections 232.

These two communication matrixes 13, 23 will enable the communication between members 12a, 12b of the first crew 12 and the communication between members 22a, 22b of the second crew 22. However, the present invention also provides the possibilities for any member 12a, 12b of the first crew 12 to communicate with any member 22a, 22b of the second crew 22 and vice versa.

In order to provide this possibility it is proposed that third input 133i and output 133o connections in the first communication matrix 13 are dedicated to members 22a, 22b of the second crew 22 as if these members of the second crew were present in the control room 11. In the same way it is proposed that fourth input 234i and output 234o connections in the second communication matrix 23 are dedicated to members 12a, 12b of the first crew 12 as if these members of the first crew were present at the site 21.

A connection between a member 12a of the first crew 12 and a member 22a of the second crew 22 can thus be established by communicating outgoing data from the third output connections 133o to the fourth input connections 234i and outgoing data from the fourth output connections 234o to the third input connections 133i.

This data is communicated by means of the signal path 31 as being first 311' or secondary 312' data depending on the real-time requirements of the communication, and comprises outgoing data from the third 133o and fourth 234o output connections and incoming data to the third 133i and fourth 234i input connections.

An example of a connection between a member 12a on the first crew 12 and a member 22a on the second crew 22 will now be described as an illustrating example of the inventive way of providing this connection.

In this example input connection "3" and output connection "C" amongst the first connections 131i, 133o on the first communication matrix 13 has been allocated to the member 12a on the first crew 12. According to the invention input connection "3" and output connection "C" amongst the fourth connections 234i, 234o on the second matrix 23 are also allocated to the same member 12a on the first crew 12.

Also in this example input connection "6" and output connection "F" amongst the second connections 232i, 2320 on the second communication matrix 23 has been allocated to the member 22a on the second crew 22. According to the invention input connection "6" and output connection "F" amongst the third connections 133i, 1330 on the first matrix 13 are also allocated to the same member 22a on the second crew 22.

In order to enable these two members 12a, 22a to communicate with each other input connection "3" amongst the first input connections 131i on the first communication matrix 13 is to be connected to output connection "F" amongst the second output connections 2320 on the second communication matrix 23.

This is achieved by switching the incoming data from input connection "3" amongst the first input connections 131i to output connection "F" amongst the third output connections 1330 on the first communication matrix 13, the data is then communicated through the signal path 31 to the second communication matrix 23 to input connection "3" amongst the fourth input connections 234i on the second communication matrix 23. The data is then switched from input connection "3" amongst the fourth input connections 234i to output connection "F" amongst the second output connections 232o on the second communication matrix 23 and a path from the member 12a on the first crew 12 to the member 22a of the second crew 22 has been established.

In order to provide a two way communication between the two members 12a, 22a a path is established from the member of the second team 22a to the member of the first team 12a in the same way, that is from input connection "6" amongst the second connections 232i to output connection "C" amongst the fourth output connections 2340 on the second communication matrix 23, from this fourth output connection 234o via the signal path 31 to input connection "6" amongst the third connections 133i on the first communication matrix 13, and from this input connection "6" amongst the third connections 133i to output connection "C" amongst the first connections 1310 on the first communication matrix 13.

It is proposed that the secondary data 312' comprises control data Ctrl23 required to set up, manage and control the second communication matrix 23 from the control room 11, which means that all connections required between different crew members can be established from the control room regardless of which crew the members belong to.

It is also proposed that the second communication matrix 23 is configured and managed to be a logical mirror of the first communication matrix 13, which means that any connection or any release of a connection made between an input connection and an output connection in the first communication matrix 13 is also made simultaneously between corresponding input connection and output connection on the second communication matrix 23. This means that in the example above when a connection 13a is made between the input connection "3" amongst the first input connections 133i and output connection "F" amongst the third output connections 133o on the first communication matrix 13 the corresponding connection 23a is also made simultaneously between input connection "3" amongst the fourth input connections 234i and output connection "F" amongst the second output connections 232o on the second communication matrix 23. This can be achieved by copying the control signal ctrl13 used to control the first communication matrix 13 and send it as secondary data 312' to function as a control signal ctrl23 to the second communication matrix 23.

Different data streams belonging to the secondary data 312' may have mutually different requirements regarding the delay in communication. In order to provide a possibility to prioritize and optimize the use of available bandwidth for the complete data stream 3' between the first and second part 1, 2 it is proposed that the second logical signal path 312 is divided into several different signal paths each providing different quality of service, where data related to real time applications, such as remote control of equipment and voice communication between crew members, is adapted to be communicated through a logical signal path with a higher quality of service than data related to non real time applications, such as error management and management of the communication matrixes.

The present invention proposes that in order to achieve required quality of service in the communication at least the first logical signal path 311 is realized by means of optical fiber communication.

It is also proposed that the second logical signal path 312 is realized by means of optical fiber communication.

Figure 3:
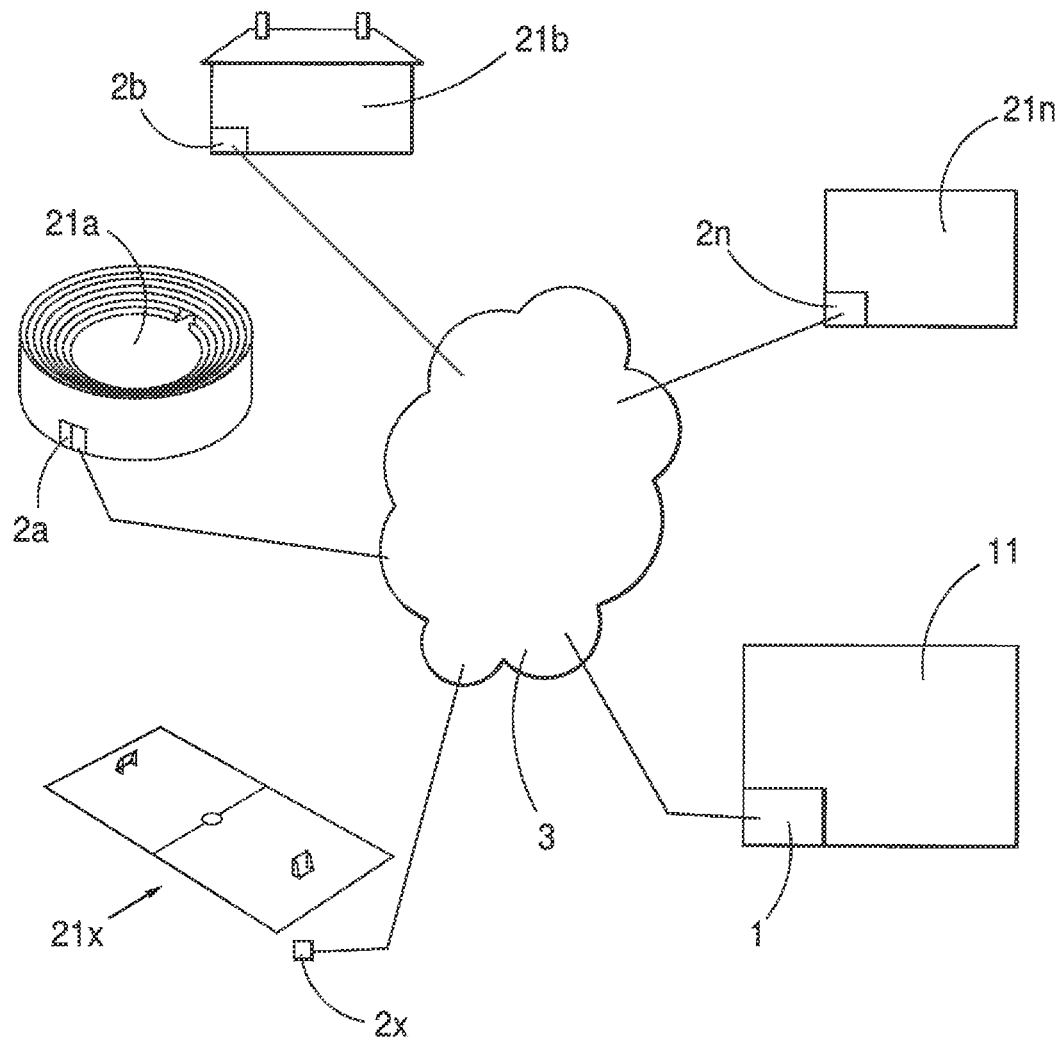
FIG. 3 is a schematic and simplified illustration of a first part communicating with several separate second parts.

FIG. 3 shows schematically that the first part 1 may be a standard part or equipment in a control room 11 for video production and the second part 2a, 2b, . . . , 2n may be a standard part that can be positioned at different sites 21a, 21b, . . . , 21n that are frequently used for video recordings, such as arenas for sports or other entertainment. This will provide an easily accessible interface between sites that are frequently used and equipment that is brought to the site for recording, where it is easy for the control room 11 to connect to the second part 2a, 2b, . . . , 2n over the wide area network 3 and access the equipment used on the site.

The second part 2x may also be a mobile part that can be moved and transported to a remote site 21x without having the problems of moving a complete OB Bus.

It is also proposed that the first part 1 is adapted to communicate with two or more separate second parts 2a, 2b, . . . , 2n, 2x simultaneously, which second parts can be positioned at different sites or at a distance from each other on one large site hosting a large event, where the separate second parts may be used for remote video and/or audio production related to an event taking place on several different sites or related to different events not related to each other.

Figure 4:
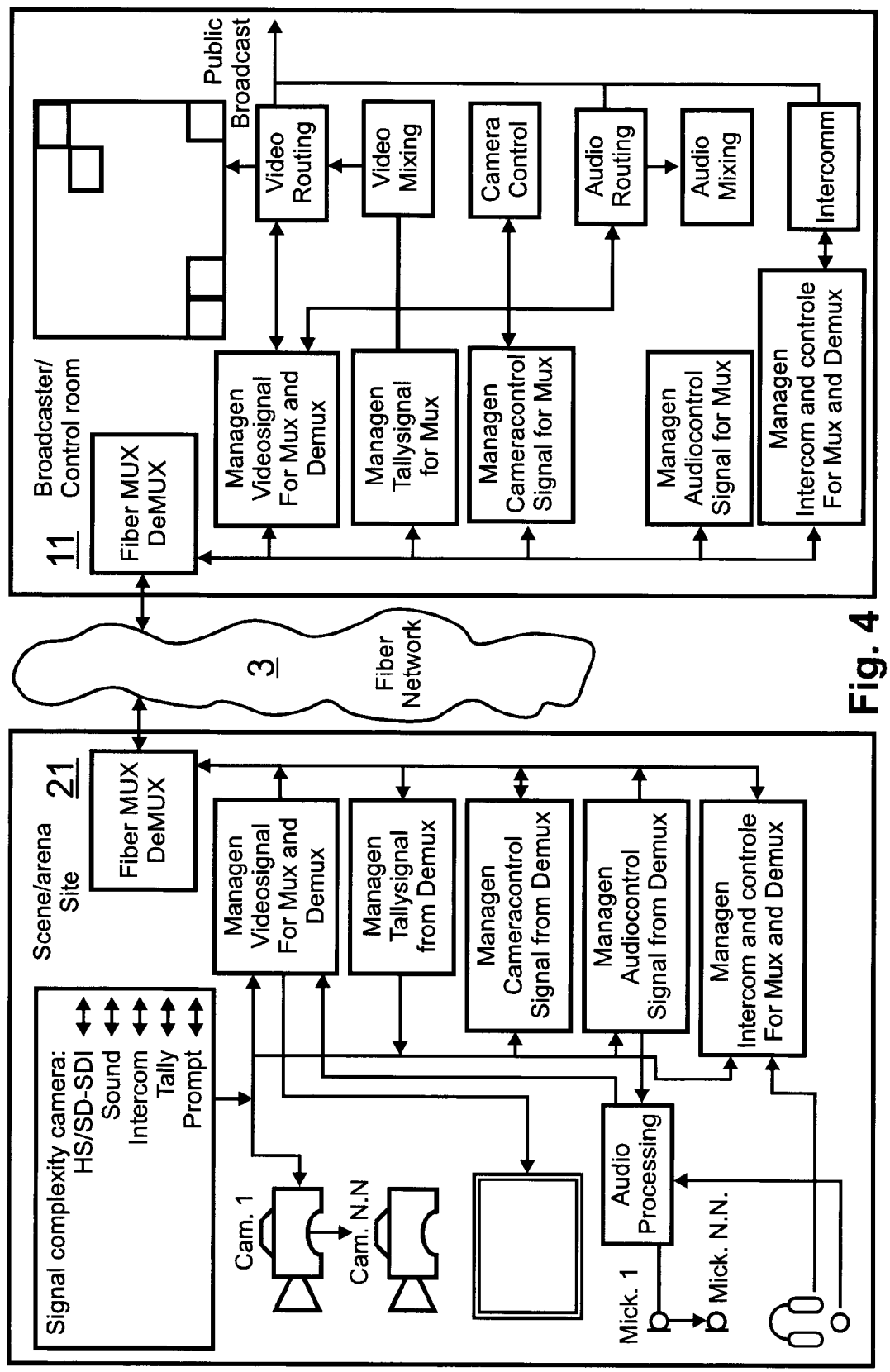
FIG. 4 is a schematic illustration of components included in an inventive system.

FIG. 4 shows an illustration of different functions and components that can be present at a control room 11 and at a site 21, where it is shown that the first part 1 can comprise a fiber MUX DeMUX and units for managing incoming video signal, tally signal or "on air signal", camera control signal, audio control signal and the intercom signal used for communication between members of the different crews.

It is also shown that the second part 2 can comprise a fiber MUX DeMux and units for managing the video signal, the tally signal, camera control signals, audio control signals and the intercom signal.

It will be understood that the invention is not restricted to the aforedescribed and illustrated exemplifying embodiments thereof and that modifications can be made within the scope of the invention as defined by the accompanying Claims.

The invention claimed is:

1. A system for remote video and/or audio production, said system comprising:
   a first part related to a control room for said video production and a second part on a site of an event to be recorded, where said first and second parts communicate with each other by means of a data stream, where said data stream is adapted to be sent between said first and second parts by means of a wide area network, and where a signal path is established through said wide area network between said first and second parts;
   wherein said signal path comprises a first and a second logical signal path;
   wherein the first logical signal path is adapted to transport primary data and is adapted to provide a quality of service with zero time delay in the transportation of the primary data, wherein the primary data transported through the first logical signal path is uncompressed;
   wherein the second logical signal path is adapted to transport secondary data, wherein the secondary data is transported at a lower quality of service than the primary data through the first logical signal path;
   wherein said second logical signal path is adapted for two way communication between said first and second part; and
   wherein said primary data is real time data including video and audio signals.

2. The system according to claim 1, wherein said secondary data comprises remote camera control data that controls remote cameras on said site from said control room.

3. The system according to claim 2, wherein said secondary data comprises control data between any camera remote control panel in said control room and any camera control unit at said site.

4. The system according to claim 1, wherein said secondary data comprises remote audio control data that controls remote audio on said site from said control room.

5. The system according to claim 1, wherein said secondary data comprises data for error management and error control of equipment on said site from said control room.

6. The system according to claim 1, wherein said secondary data comprises voice communication between members of a first crew in said control room and members of a second crew on said site.

7. The system according to claim 6,
   wherein said first part comprises a first communication matrix, wherein said first communication matrix includes first input and output connections dedicated to members of said first crew and said first communication matrix is adapted to enable any required communication between members of said first crew in said control room through said first input and output connections;
   wherein said second part comprises a second communication matrix, wherein said second communication matrix includes second input and output connections dedicated to members of said second crew and said second communication matrix is adapted to enable any required communication between members of said second crew at said site through said second input and output connections;
   wherein said first communication matrix includes third input and output connections dedicated to members of said second crew as if said members of said second crew were present in said control room;
   wherein said second communication matrix includes fourth input and output connections dedicated to members of said first crew as if said members of said first crew were present at said site;
   wherein outgoing data from said third output connections are communicated to said fourth input connections and outgoing data from said fourth output connections are communicated to said third input connections; and
   wherein said secondary data comprises incoming data to said third and fourth input connections and outgoing data from said third and fourth output connections.

8. The system according to claim 7, wherein said secondary data comprises control data required to set up, manage and control said second communication matrix from said control room, and said second communication matrix is configured and managed to be a logical mirror of said first communication matrix.

9. The system according to claim 7, wherein said second logical signal path is divided into several different signal paths each providing different qualities of service, where data related to real time applications includes remote control of equipment and voice communication between crew members, wherein the data related to real time applications is adapted to be communicated through a logical signal path with a higher quality of service than data related to non real time applications, such as error management and management of the communication matrixes.

10. The system according to claim 1, wherein at least said first logical signal path is realized by means of optical fiber communication.

11. The system according to claim 10, wherein said second logical signal path is realized by means of optical fiber communication.

12. The system according to claim 1, wherein said second part is a stationary part located at a site frequently used for events to be recorded.

13. The system according to claim 1, wherein said second part is a mobile part moveable to any site used for an event to be recorded.

14. The system according to claim 1, wherein said first part is adapted to communicate with two or more second parts simultaneously.

15. A system for remote video and/or audio production, said system comprising:
   a first location corresponding to a control room for said video production;
   a second location corresponding to a site of an event to be recorded; and
   a plurality of signal paths through a network, the plurality of signal paths are configured for two-way transportation of data between the first location and the second location, wherein the plurality of signal paths includes a first signal path and a second signal path;
   wherein the first signal path is configured to transport primary data from the second location to the first location via a first data transportation protocol having a first time delay, wherein the primary data transported through the first logical signal path is uncompressed;

wherein the second signal path is configured to transport secondary data between the first location and the second location via a second data transportation protocol having a second time delay; and wherein the first time delay corresponds with a delay associated with real time data transmission, and the second time delay is greater than the first time delay.

16. The system of claim 15, wherein the primary data includes video and audio signals.

17. The system of claim 15, wherein the network is a wide area network.

18. The system of claim 15, wherein the first signal path is configured to transport the primary data at a first quality and the second signal path is configured to transport the secondary data at a second quality, wherein the first quality is greater than the second quality.

19. The system of claim 15, further comprising camera equipment located at the second location, and wherein the secondary data includes remote control signals for controlling the camera equipment from the first location.

20. The system according to claim 8, wherein said second logical signal path is divided into several different signal paths each providing different qualities of service, where data related to real time applications includes remote control of equipment and voice communication between crew members, wherein the data related to real time applications is adapted to be communicated through a logical signal path with a higher quality of service than data related to non real time applications, such as error management and management of the communication matrixes.

21. The system according to claim 7, wherein said first logical signal path is adapted for two way communication between said first and second part, and wherein said primary data comprises incoming data to said third and fourth input connections and outgoing data from said third and fourth output connections.

* * * * *